(12) United States Patent
Boffeli et al.

(10) Patent No.: US 6,425,214 B1
(45) Date of Patent: Jul. 30, 2002

(54) VEHICLE SEALING DEVICE

(75) Inventors: Thomas J. Boffeli, Dubuque, IA (US); Kenneth F. Lenz, Cuba City, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/348,690

(22) Filed: Jul. 7, 1999

(51) Int. Cl.$^7$ ................................................ E04D 13/18
(52) U.S. Cl. ................................ 52/173.2; 52/173; 52/5
(58) Field of Search .......................... 52/2.12, 173, 64, 52/204, 173.2

(56) References Cited

U.S. PATENT DOCUMENTS

| | | | | |
|---|---|---|---|---|
| 3,826,049 A | * | 7/1974 | Frommelt et al. | ............. 52/173 |
| 3,915,183 A | * | 10/1975 | Frommelt | ....................... 135/5 |
| 5,608,996 A | * | 3/1997 | Brockman et al. | ......... 52/173.2 |
| 5,927,025 A | * | 7/1999 | Brockman et al. | ......... 52/173.2 |
| 5,953,868 A | * | 9/1999 | Giuliani et al. | ............. 52/173.2 |

* cited by examiner

Primary Examiner—Carl D. Friedman
Assistant Examiner—Steve Varner
(74) Attorney, Agent, or Firm—Marshall, Gerstein & Borun.

(57) ABSTRACT

A sealing device for engaging the surface of a vehicle parked adjacent a structure and which is automatically actuated in response to the approach or departure of the vehicle. A seal member is supported by a pivoting frame which is mountable to the structure. The pivoting frame is moveable between an engaged position in which the seal is positioned to engage the vehicle surface and a released position in which the seal is spaced away from the vehicle surface. A pivoting actuating member is mountable to the structure and engages the frame. The actuating member is adapted to be responsive to movement of the vehicle, so that the frame having the attached seal member moves toward the engaged position as the vehicle approaches the structure. Accordingly, the seal member seals the interior of the cargo vehicle as well as the interior of the structure from the ingress of wind, water and other contaminants in order to maintain a safer work environment.

23 Claims, 15 Drawing Sheets

VEHICLE SEALING DEVICE

FIELD OF THE INVENTION

The present invention relates generally to a sealing device for use on loading docks and which is suitable for automatically sealing the interface between a cargo vehicle and a building.

BACKGROUND OF THE INVENTION

Bulk goods are typically transported in semi-trailers, delivery trucks, and other cargo vehicles. The goods are usually loaded and unloaded at warehouses or transfer terminals in which the rear end of the cargo vehicle is backed up to an opening in the terminal building such that the goods can be loaded and unloaded through the back door of the vehicle using conventional methods. During periods of foul weather, wind, rain, dirt and other contaminants can easily enter the small openings that surround around the interface between the cargo vehicle and the building. Besides making the work environment uncomfortable and unpleasant, the entering wind, water and dirt may represent a significant safety hazard.

Accordingly, there exists a need for a device for sealing the interface between the cargo vehicle and the terminal structure. While a variety of such structures exist, a way to effectively seal the top surface of a cargo vehicle consistently is lacking in many such structures. Variations in height of vehicles, and the tendency of the vehicle top surface to "float" up and down as the vehicle is loaded or unloaded (the added or removed weight causing the suspension to move the vehicle) complicates the sealing of this surface. Further, a stationary top seal capable of sealing for various heights could present an impediment to the vehicle as it approaches the dock, could extend into the doorway the doorway opening and impede the loading process, and would likely be subject to undue wear resulting from vehicle "float". Accordingly, a top seal that stores out of the path of an approaching vehicle, and that engages the vehicle as it is parked would be desirable.

SUMMARY OF THE INVENTION

The sealing device according to the present invention actuates automatically in response to a cargo vehicle approaching the loading dock or terminal, and thus no labor must be diverted from the task of loading or unloading cargo. Likewise, the sealing device automatically retracts when the vehicle leaves the loading dock, and consequently the sealing device is positioned out of the way to receive the next cargo vehicle.

According to one aspect of the invention, a device for sealing the surface of a vehicle parked adjacent a structure includes a seal member, a frame supporting the seal member, and an actuating member. The frame is mountable to the structure and is moveable between an engaged position in which the seal is positioned to engage the vehicle surface and a released position in which the seal is spaced away from the vehicle surface. The actuating member is pivotally mountable to the structure and engages the frame, and is responsive to movement of a vehicle so that the frame is moved toward the engaged position as the vehicle approaches the structure.

The seal member may be rotationally mounted to the frame, and preferably includes a compressible structure such as a compressible foam pad. The frame preferably includes a pair of legs or struts, each having an inward end pivotally mounted to the structure and an outward end, with the seal extending between the outward ends.

Preferably, a pair of actuating members are provided, with each actuating member being mounted to a corresponding frame strut by a coupling assembly which is moveable along the frame struts. A portion of each strut defines a longitudinal track which is defined in part by a pair of flanges, and the coupling assembly includes a wheeled trolley which engages and moves along the track as the frame shifts between the engaged and retracted positions. The wheeled trolley is extensibly mounted to the actuating member by a spring, which is adjustably connected to the actuating member so that the spring force can be controlled.

The actuation member includes an upper end and a lower end, and may include a pivot mounted to the building intermediate the upper and lower ends. A return spring at the lower end connected to the structure biases the frame member toward the released position. Finally, a protective awning and a flexible skirt may be provided for covering the frame, the seal member, and the actuating member.

In accordance with another aspect of the invention, a device for sealing the surface of a vehicle includes a support structure, a frame pivotally mounted to the support structure, a seal mounted to the frame and positioned to span the vehicle surface, and an actuating member responsive to movement of the vehicle. The actuating member is pivotally mounted to the structure and engages the frame, and is adapted to shift the frame between an engaged position in which the seal abuts the vehicle surface and a released position in which the seal is spaced from the vehicle surface.

In accordance with yet another aspect of the invention, a device for sealing the surface of a vehicle parked in a loading dock attached to a building includes a seal member pivotally mounted to the building and shiftable between an engaged position in which the seal member is positioned to contact the vehicle surface and a released position in which the seal member is spaced away from the vehicle surface. Actuation means mountable to the building engages the seal member for shifting the seal between the engaged and released positions in response to movement of the vehicle.

According to a still further aspect of the invention, a device for sealing the surface of a vehicle parked in a loading dock structure includes a seal member pivotally mounted to the structure and shiftable between an engaged position, in which the seal member is positioned to contact the vehicle surface, and a released position, in which the seal member is spaced away from the vehicle surface. An actuator is mounted to the dock structure and engages the seal member. The actuator is adapted to shift the seal member between the engaged and released positions in response to movement of the vehicle.

According to yet another aspect of the invention, a device for sealing a surface of a vehicle parked in a loading dock structure includes a first frame pivotally attached to the dock structure and having an attached seal member positioned to lie generally adjacent to the surface of a vehicle parked adjacent the dock structure, and a second frame pivotally mounted to the dock structure and being shiftable between an extended position pivoted away from the dock structure and a retracted position pivoted toward the structure. The second frame includes an actuating portion operatively engaging a portion of the first frame. The actuating portion shifts the first frame between a released position, in which the seal is spaced away from the surface of the vehicle when the second frame is in the extended position, and an engaged position, in which the seal abuts the surface of the vehicle when the second frame is in the retracted position.

In accordance with an additional aspect of the invention, an apparatus for sealing a generally horizontal top surface of a vehicle parked adjacent to a structure comprises a seal member and a support member shiftably mounted to the structure and being operatively coupled to each other. The seal member is moveable between a first position spaced away from the vehicle top surface and a second position generally adjacent to and engaging a portion of the vehicle top surface. The support member is moveable between a first position and a second position in response to movement of a vehicle toward the structure. The support member supports the seal member when both are in their respective first positions, and also permits the seal member to move to the second position engaging the vehicle top surface as movement of the vehicle moves the support member to its second position.

According to a still further aspect of the invention, a device for sealing a surface of a vehicle parked adjacent to a structure comprises a seal member shiftably mounted to the structure, a support member shiftably mounted to the structure and engaging the seal member, and a return mechanism operatively engaging the seal member and the support member. The seal member is moveable between a retracted position, wherein the seal member is spaced away from the vehicle surface, and an engaged position, wherein the seal member is positioned to engage the vehicle surface. The support member is moveable from a first position, wherein the support member supports the seal member in the retracted position, toward a second position, wherein the support member permits movement of the seal member toward the engaged position. The support member is moveable between the first and second positions in response to movement of a vehicle toward the structure. The return mechanism is adapted to return the seal member toward the first position upon movement of a vehicle away from the structure.

These and other features and advantages of the invention will become readily apparent to those skilled in the art upon a reading of the following description and claims.

BRIEF DESCRIPTION OF THE DRAWINGS

FIG. 12A is a fragmentary view in perspective of the device shown in FIG. 12;

FIG. 13A is an enlarged fragmentary cross-sectional view taken along line 13A—13A of FIG. 13.

DETAILED DESCRIPTION OF THE PREFERRED EMBODIMENT

The following description of the preferred embodiments is not intended to limit the scope of the invention to the precise forms disclosed, but instead is intended to be illustrative of the principles of the invention so that others may follow its teachings.

Figure 1:
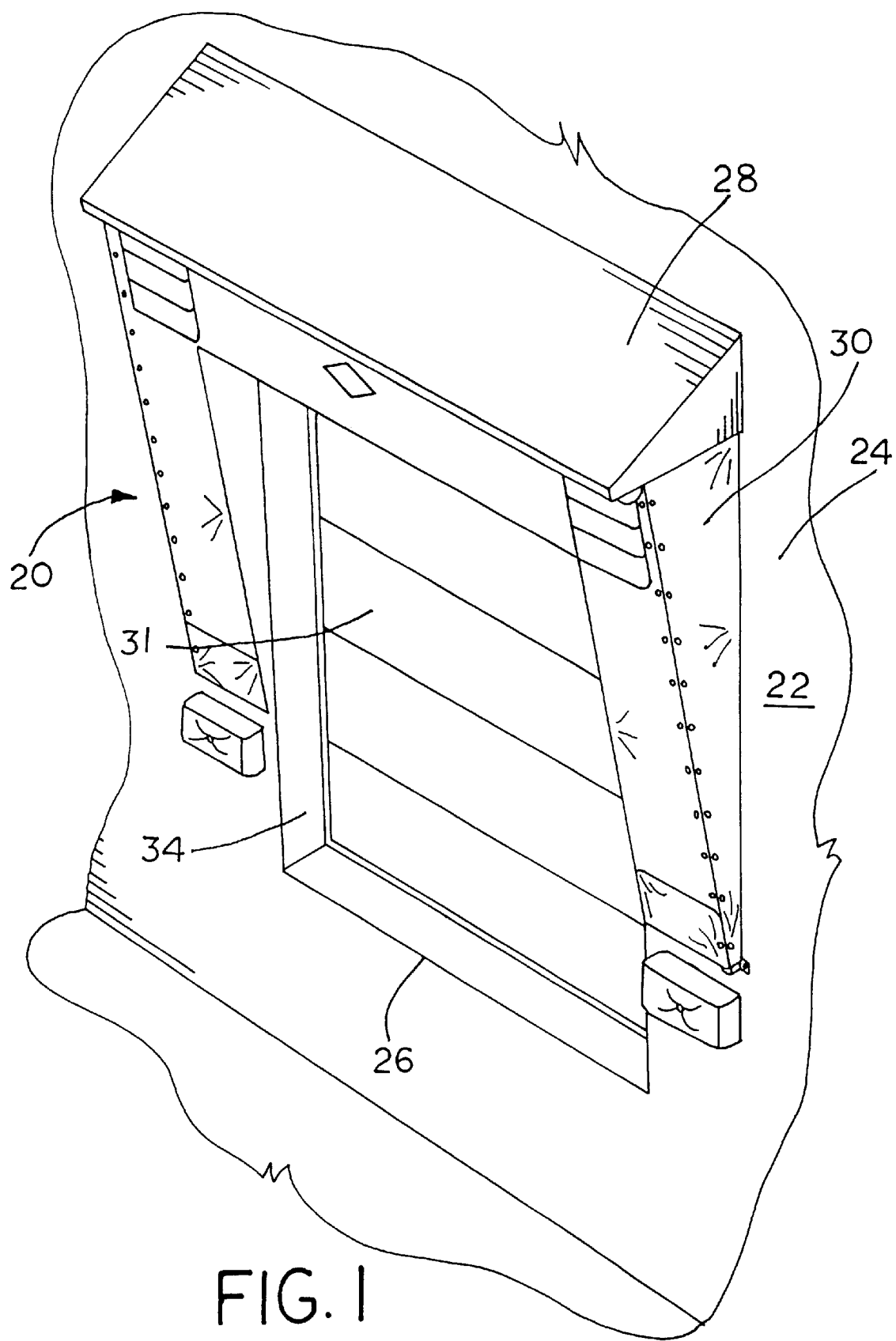
FIG. 1 is a perspective view of a vehicle sealing device constructed in accordance with the teachings of the present invention and shown mounted for use adjacent a loading dock.

Referring now to FIGS. 1 through 5 of the drawings, a sealing device assembled in accordance with the teachings of the present invention is generally referred to by the reference numeral 20 and is shown attached to a wall 22 of an edifice or building 24 having a loading dock 26 as shown in FIG. 1. Preferably, an awning 28 and a flexible skirt 30 of the types commonly employed in the industry are provided. The skirt 30 includes an access opening 31. It will be understood that the device 20 is provided in order to provide a seal between a vehicle 32, such as the vehicle 32 shown in FIGS. 3, 4 and 5, and the building 24, such that rain, wind, dirt, dust, and/or other substances are effectively prevented from entering the building 24 via an opening 34 in the wall 22.

Figure 2:
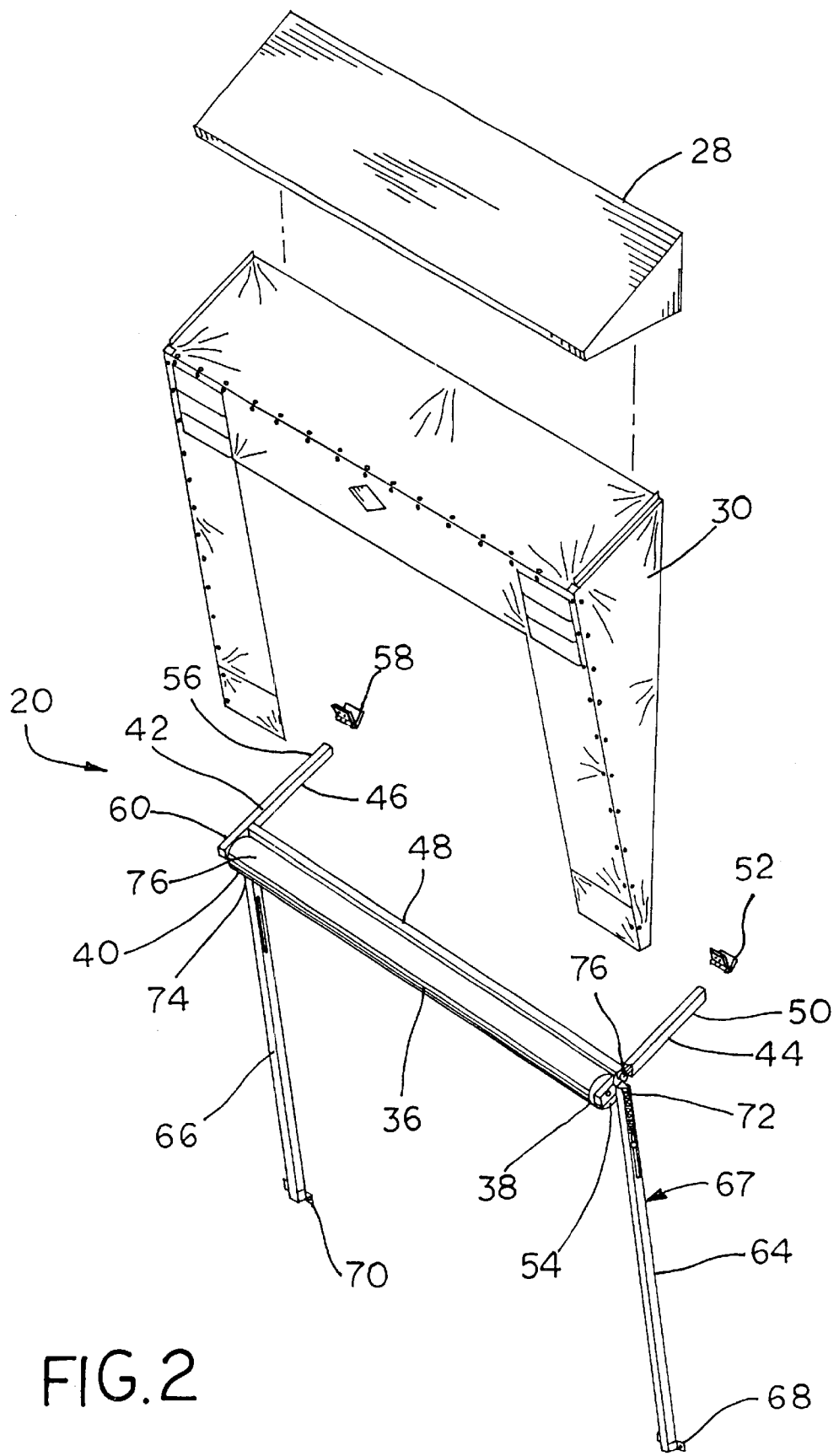
FIG. 2 is an exploded view of the vehicle sealing device shown in FIG. 1.

Referring now to FIG. 2, the device 20 includes a seal member 36 having a pair of ends 38, 40. The seal member 36 is preferably resilient, and may be constructed of a compressible open cell polyurethane foam, and is sized to span across a top surface 33 of the vehicle 32. The seal member 36 is preferably cylindrical in shape, although other shapes may also be employed. The seal member 36 is mounted to a supporting frame 42 which in this embodiment includes a pair of members or struts 44, 46 and an interconnecting crossbar 48. The strut 44 includes an inner end 50 mounted to the wall 22 of the building 24 by a pivot or hinge 52. The strut 44 also includes an outer end 54. The strut 46 includes an inner end 56 mounted to the wall 22 of the building 24 by a pivot or hinge 58. Accordingly, the frame 42 and the seal member 36 attached thereto are moveable or shiftable relative to the building 24. The strut 44 also includes an outer end 60. The end 38 of the seal member 36 is mounted to the outer end 54 of the strut 44, while the end 40 of the seal member 36 is mounted to the outer end 60 of the strut 46. Preferably, the ends 38 and 40 of the seal member 36 are rotatably mounted to their adjacent strut ends 54, 56, respectively. Still preferably, the seal member 36 may have an internal stiffening member, such as an internal crossbar (not shown).

A pair of actuating members 64, 66 are mounted to the wall 22 of the building 24 by a pair of pivots or hinges 68, 70, respectively. The actuating members 64, 66 include an upper end 72, 74, respectively. A cross member (not shown) may be provided between the actuating members 64, 66 such that the actuating members 64, 66 functions as a frame unit 67. In this embodiment, each of the upper ends 72, 74 of the actuating member 64, 66, respectively, is operatively coupled to its corresponding strut 44, 46 by an extensible coupling 76. Further, the actuating members 64, 66 will support the frame 42 in the position of FIGS. 2 and 3, and will continue to support the frame 42 until the seal member 36 comes into contact with the surface 33 of the approaching vehicle 32 as will be outlined below.

As shown in FIG. 1, the skirt 30 covers all or portions of the frame 42 and the seal member 36, and the access opening 31 of the skirt 30 provides access to the opening 34 in the wall 22. One of skill in the art would appreciate that foam may be included within the skirt 30 to allow it to compressively seal against the sideways of the vehicle.

It will be noted that the coupling 76 between the upper end 74 of the actuating member 66 to the strut 46 is obscured in FIG. 2 by the seal member 36. However, it will be understood that the coupling 76 at the upper end 74 of the actuating member 66 is identical to the coupling 76 at the upper end 72 of the actuating member 64. Accordingly, only one such coupling 76 will be described herein in detail. The operation of the coupling 76 atop each of the actuating members 64 and 66 is substantially identical and produces substantially identical relative movement between the actuating members 64, 66 and their associated struts 44, 46 as will be explained below.

Figures 3, 3A:
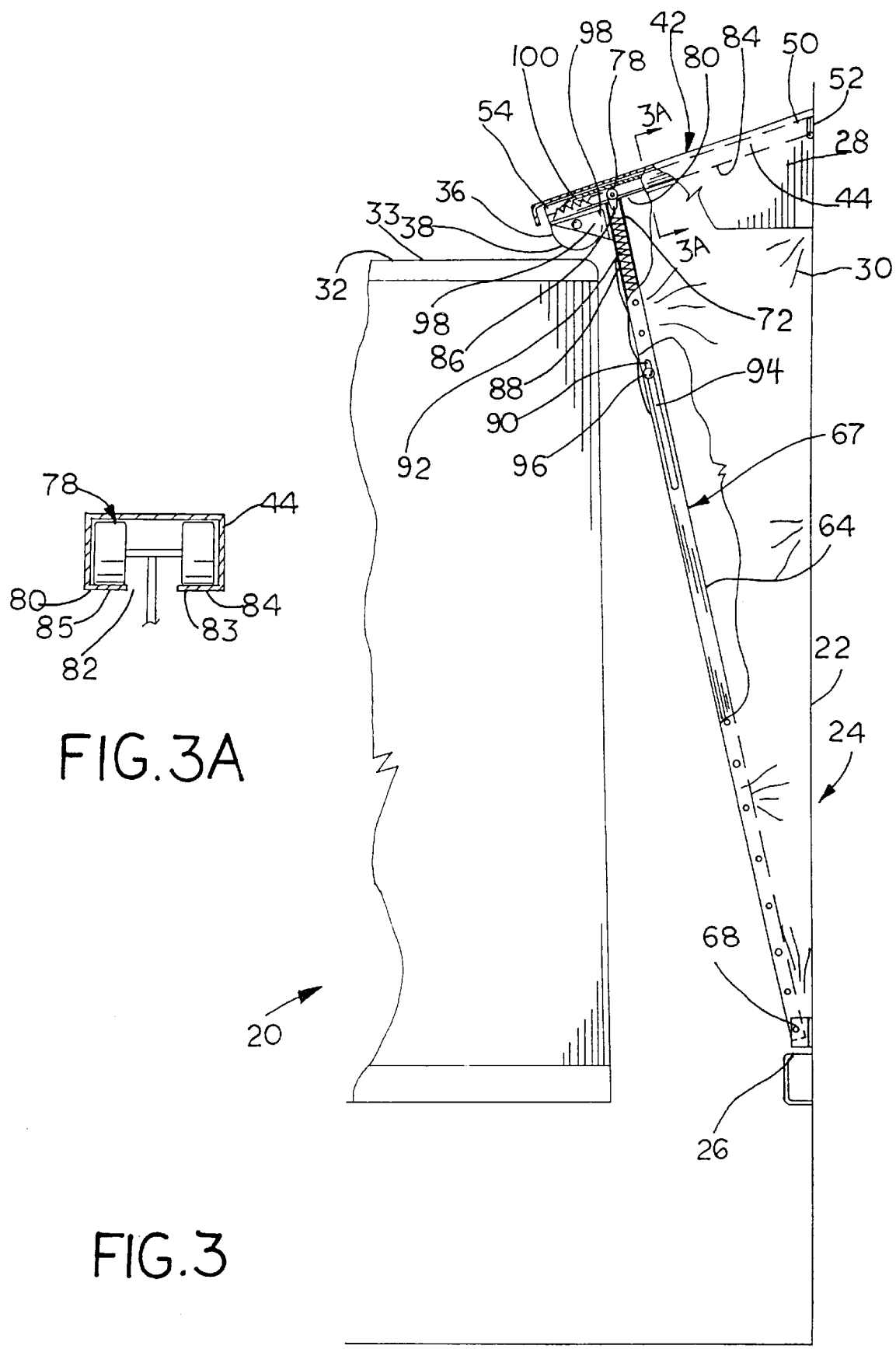
FIG. 3 is an elevational view, partly in section, of the device shown in FIGS. 1 and 2.
FIG. 3A is an enlarged fragmentary cross-sectional view taken along line 3A—3A of FIG. 3.

Referring now to FIGS. 3 and 3A, the coupling 76 includes a roller or trolley assembly 78 which rides on a track 80 defined by a slot 82 in a bottom surface 84 of the strut 44. The slot 82 is created by a pair of flanges 83, 85. The trolley assembly 78 is connected to the upper end 86 of a spring 88. The spring 88 includes a lower end 90 which is mounted within a cavity 92 defined by the actuating member 64.

Figure 4:
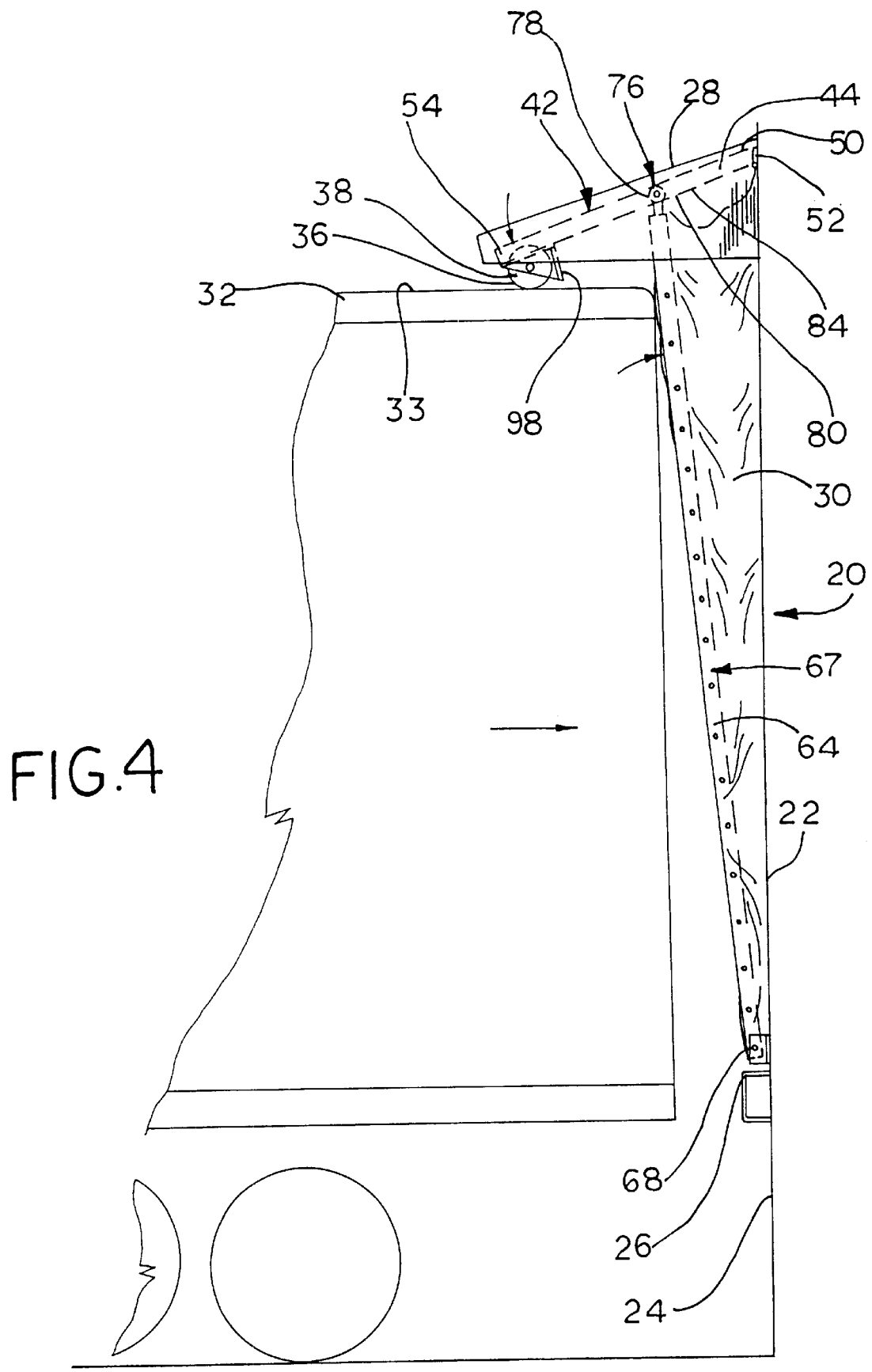
FIG. 4 is an elevational view similar to FIG. 3 but showing a truck moving toward the loading dock and coacting with one or more portions of the device.
Figure 5:
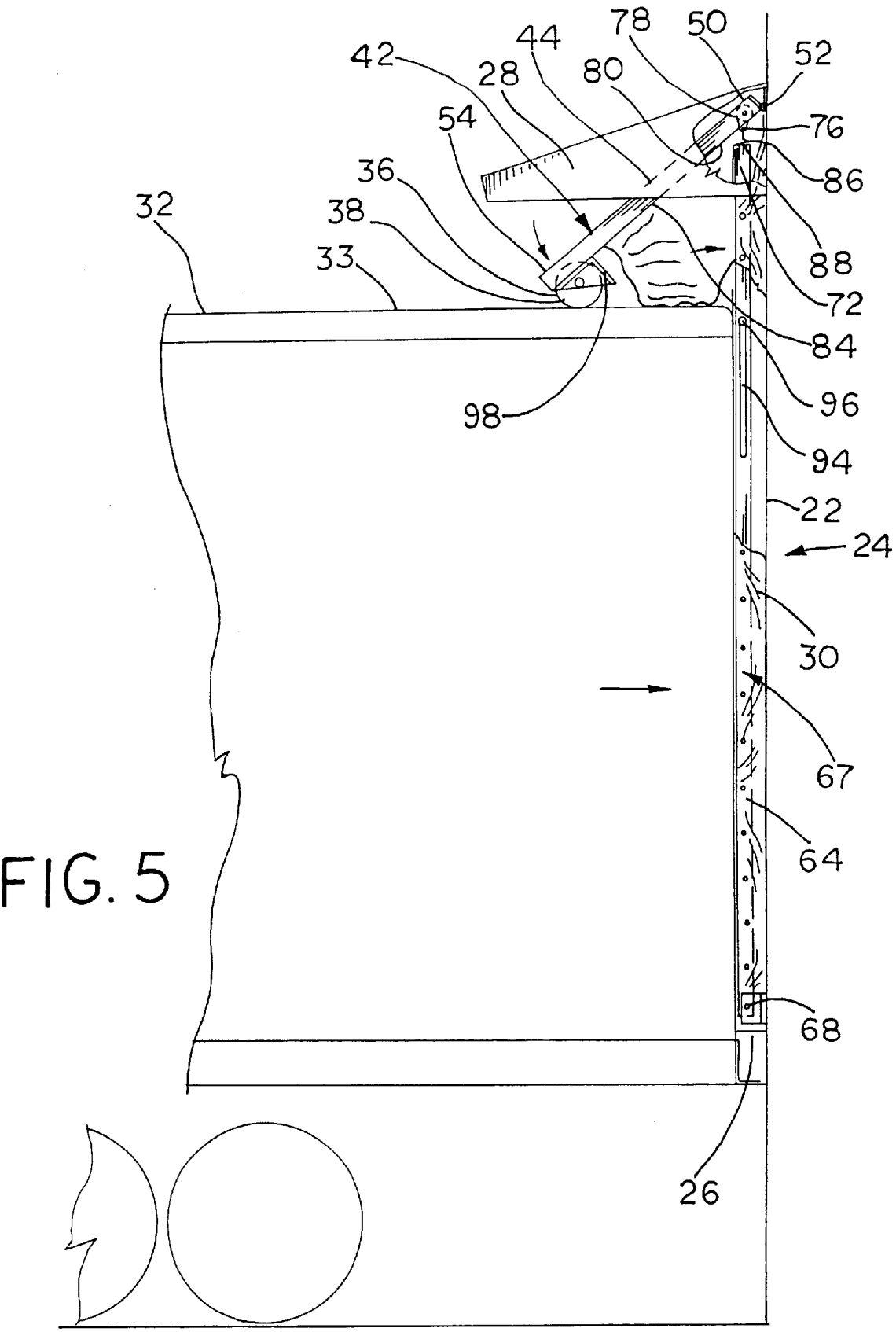
Fig. 5 is an elevational view similar to FIGS. 3 and 4 but showing the truck parked so that the sealing device engages the top surface of the truck.

Preferably, the lower end 90 of the spring 88 is adjustably mounted to the actuating member 64, such as by securing the lower end 90 of the spring 88 to a slot 94 defined in the actuating member 64 using a bolt 96. By virtue of the trolley assembly 78 engaging the track 80 of the strut 44, the coupling 76 (and hence the upper end 72 of the actuating member 64) is moveable along the strut 44 between the outer end 54 and the inner end 50 of the strut 44. As shown in FIGS. 3, 4 and 5, this relative movement produces a corresponding movement in the position of the frame 42 and the attached seal member 36, between the raised, disengaged, or released position of FIG. 3 and the lowered or engaged position of FIG. 5. As shown in FIG. 5, when the frame 42 is in the lowered or engaged position the seal member 36 contacts a surface (such as the top surface 33) of the vehicle 32.

It will be understood that this relative movement may be produced in response to the movement of the vehicle 32 toward the building 24. It will also be understood that the opposite relative movement will be produced by movement of the vehicle 32 away from the building 24.

As shown in FIG. 3, the outer end 54 of the strut 44 preferably includes a stop 98, such as an angled bracket. Preferably, a return spring 100 resiliently connects the trolley assembly 78 to the outer end 54 of the strut 44. Accordingly, the trolley assembly 78 is biased toward the position of FIG. 3.

In operation, the device at rest will be positioned substantially as shown in FIG. 1. When the vehicle 32 approaches the building 24, a rear portion of the vehicle 32 contacts the actuating members 64, 66. For the purposes of explanation it will be assumed that the vehicle 32 contacts the actuating members 64 and 66 simultaneously, although such simultaneous contact is not necessary for the proper operation of the device 20 and in actual practice would undoubtedly be rare.

Upon contact, and with the vehicle 32 approaching the wall 22 of the building 24 in the direction shown in FIG. 3, the actuating members 64, 66 pivot about their respective hinges 68, 70 such that their respective upper ends 72, 74 are moved. As outlined above, each upper end 72, 74 moves relative to its corresponding strut 44, 46.

For example, the upper end 72 of the actuating member 64 will move from the outer end 54 of the strut 44 toward the inner end 50. Similarly, the upper end 74 of the actuating member 66 will move from the outer end 60 toward the inner end 56 of the strut 46. By virtue of the hinges 52 and 58, the entire frame 42 will pivot such that the seal member 36 begins to approach the surface 33 of the vehicle 32 as shown in FIG. 4. Such movement continues until contact is made between the seal member 36 and the surface 33 of the vehicle 32.

Further movement causes the spring 88 to bias the frame 42 downwardly about the hinges 52 and 58, which thus compresses the seal member 36 against the surface 33, enhancing the quality of the seal therebetween. In the process, by virtue of the springs 88, each trolley assembly 78 is moved away from the corresponding upper ends 72, 74, such that the struts 44, 46 no longer contact their corresponding actuating member 64, 66, respectively. The movement of the actuating members 64, 66 out of the way thus permits the frame 42 to pivot downwardly until the seal member 36 makes abutting contact with the surface 33 of the vehicle 32. The hinges 52 and 58 further permit the frame 42 to pivot upwardly or downwardly in response to vehicle "float" (i.e., movement of the surface 33 of the vehicle 32 upwardly as the vehicle 32 is unloaded or movement of the surface 33 downwardly as the vehicle 32 is loaded). Additionally, the spring 100 in each strut 44, 46 applies a biasing force on each of the trolley assemblies 78 (i.e., each trolley assembly 78 is biased toward the outer end 54, 60 of its corresponding strut 44, 46, respectively). The biasing force supplied by the spring 100 thus further enhances the sealing contact between the seal member 36 and the surface 33 of the vehicle 32. The spring 100 also serves to maintain a positive seal during vehicle "float."

When the vehicle reaches the position of FIG. 5, the seal member 36 is in full contact with the surface 33 of the vehicle 32. The awning 28 and the skirt 30, in addition to the seal member 36, thus provide for a full seal around the perimeter of the opening 34 in the wall 22.

Figure 6:
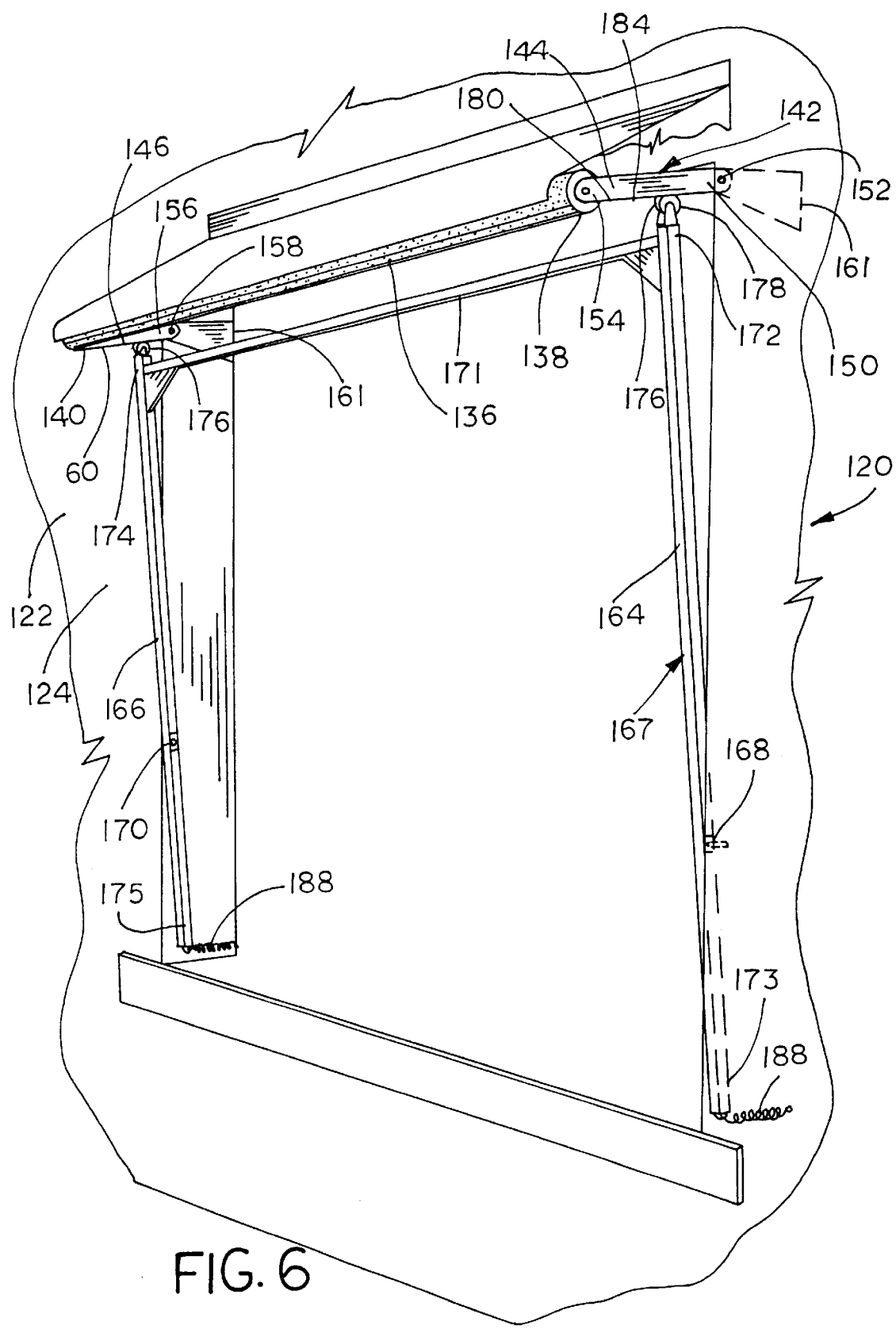
FIG. 6 is a perspective view of a vehicle sealing device constructed in accordance with the teachings of a second embodiment of the present invention and shown mounted for use adjacent a loading dock.
Figure 7:
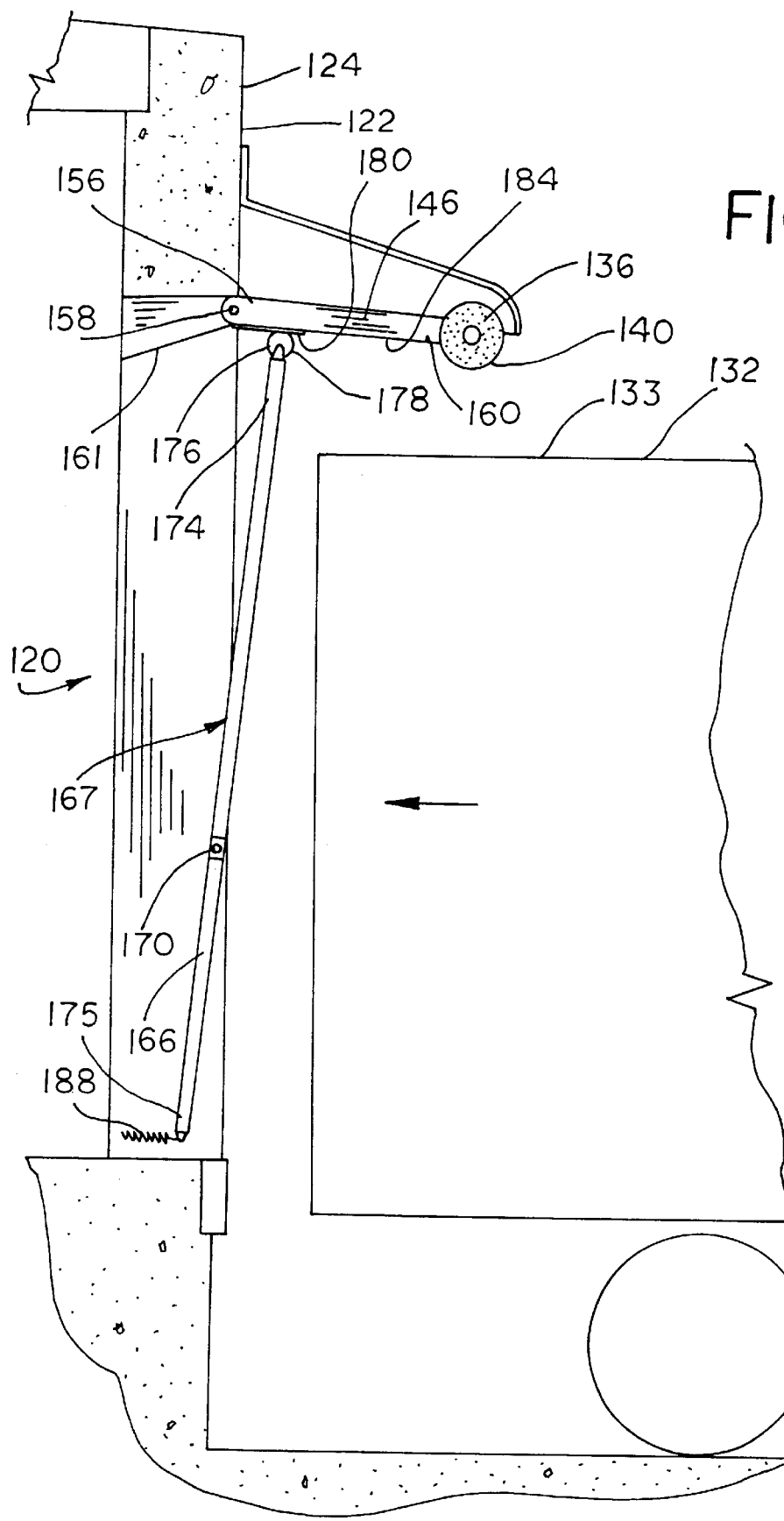
FIG. 7 is a side elevational view of the vehicle sealing device of FIG. 6 showing a truck approaching the loading dock and engaging a portion of the sealing device.
Figure 8:
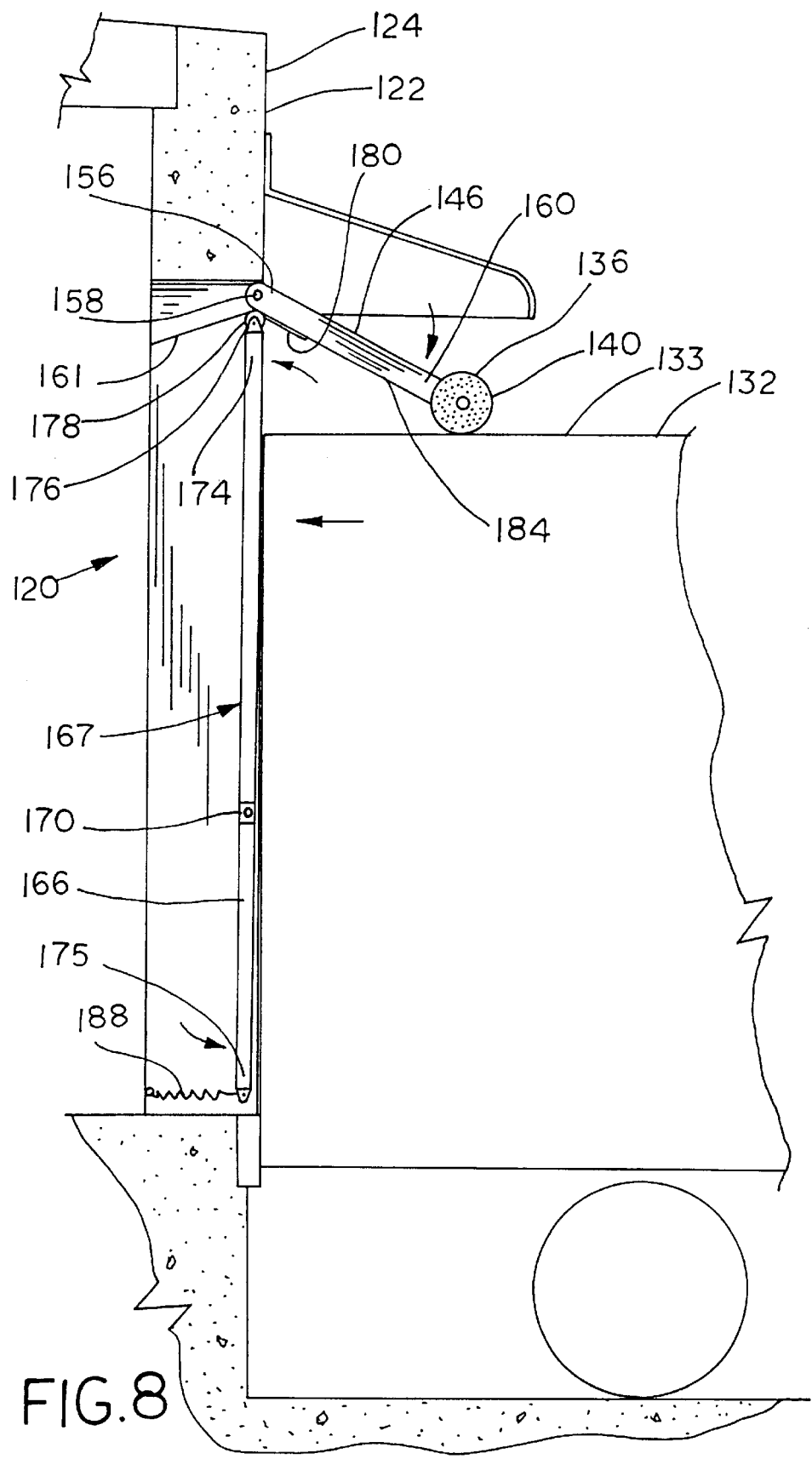
FIG. 8 is a side elevational view of the device shown in FIGS. 6 and 7 but showing the truck parked with the seal engaging the top surface of the truck.

Referring now to FIGS. 6, 7 and 8, a sealing device assembled in accordance with the teachings of a second embodiment of the present invention is shown and is generally referred to by the reference numeral 120. It will be understood that elements that are the same or similar to the elements described with respect to the embodiment discussed above will retain the same reference characters, but will be increased by 100.

The device 120 includes a resilient, compressible seal member 136 having a pair of ends 138, 140. The seal member 136 is mounted to a supporting frame 142 which includes a pair of members or struts 144, 146 and an interconnecting crossbar 148. The strut 144 includes an inner end 150 mounted to the wall 122 of the building 124 by a pivot or hinge 152. The strut 144 also includes an outer end 154. The strut 146 includes an inner end 156 mounted to the wall 122 of the building 124 by a pivot or hinge 158. The strut 144 also includes an outer end 160. The end 138 of the seal member 136 is mounted to the outer end 154 of the strut 144, while the end 140 of the seal member 136 is mounted to the outer end 160 of the strut 146. The struts 144, 146 may alternatively be mounted to mounting brackets 161 such as is shown in phantom in FIG. 6. Preferably, the ends 138 and 140 of the seal member 136 are rotatably mounted to their adjacent strut ends 154, 156, respectively. Still preferably, the seal member 136 may have an internal stiffening member, such as an internal crossbar (not shown).

A pair of actuating members 164, 166 are mounted to the wall 122 of the building 124, each by intermediate pivots 168, 170, respectively. The actuating members 164 and 166 function as a frame unit 167 with the addition of a stiffening cross member 171. The actuating members 164, 166 include an upper end 172, 174, respectively, and lower ends 173, 175, respectively. Each lower end 173, 175, is connected to the wall 122 of the building 124 by a spring 188. It will be noted that the pivot 168 is between the ends 172 and 173, while the pivot 170 is between the ends 174, 175. Accordingly, the actuating members 164, 166 will be biased toward a first position as shown in FIGS. 6 and 7. Each of the upper ends 172, 174 of the actuating member 164, 166, respectively, is operatively coupled to its corresponding strut 144, 146 by a wheeled coupling 176.

It will be noted that the coupling 176 between the upper end 174 of the actuating member 166 and the strut 146 is identical to the coupling 176 at the upper end 172 of the actuating member 164. The operation of the coupling member 176 atop each of the actuating members 164 and 166 is substantially identical and produces substantially identical relative movement between the actuating members 164, 166 and their associated struts 144, 146 as will be explained below.

Each coupling 176 includes a roller 178 which rides on a bottom surface 184 of the strut 144, which bottom surface may be thought of as forming a track 180. By virtue of the roller 178 engaging the track 180 of the strut 144, the coupling 176 (and hence the upper end 172 of the actuating member 164) is moveable relative to the strut 144 along a slightly arcuate but generally linear path between a position disposed toward the outer end 154 and a position disposed toward the inner end 150 of the strut 144. The upper end 174 of the actuating member 166 moves relative to its corresponding strut 146 in a similar manner. This relative movement produces a corresponding movement in the position of the frame 142 and the attached seal member 136, between the first, raised, disengaged, or released position of FIG. 6 and 7, and a second, lowered or engaged position as shown in FIG. 8. As shown in FIG. 8, when the frame 142 is in the lowered or engaged position the seal member 136 contacts a surface (such as the top surface 133) of the vehicle 132.

Again, this relative movement may be produced in response to the movement of the vehicle 132 toward the building 124. It will be understood that the biasing force supplied by the springs 188 will produce the opposite relative movement as the vehicle 132 moves away from the building 124. Consequently, the frame unit 167 may be disposed in a supporting position in which the actuating members 164, 166 support their corresponding struts 144, 146 of the frame 142 such that the seal member 136 will be supported in the position of FIGS. 6 and 7. By virtue of the vehicle 32 approaching the building 124, the members 164, 166 will be shifted toward the nonsupporting position of FIG. 8, such that the frame 142 and the attached seal member 136 will shift downwardly (i.e., by dropping under the force of gravity as each strut 144, 146 rotates about its hinge 152, 158) in order to bring the seal member 136 into contact with the surface 133 of the vehicle 132.

Figure 9:
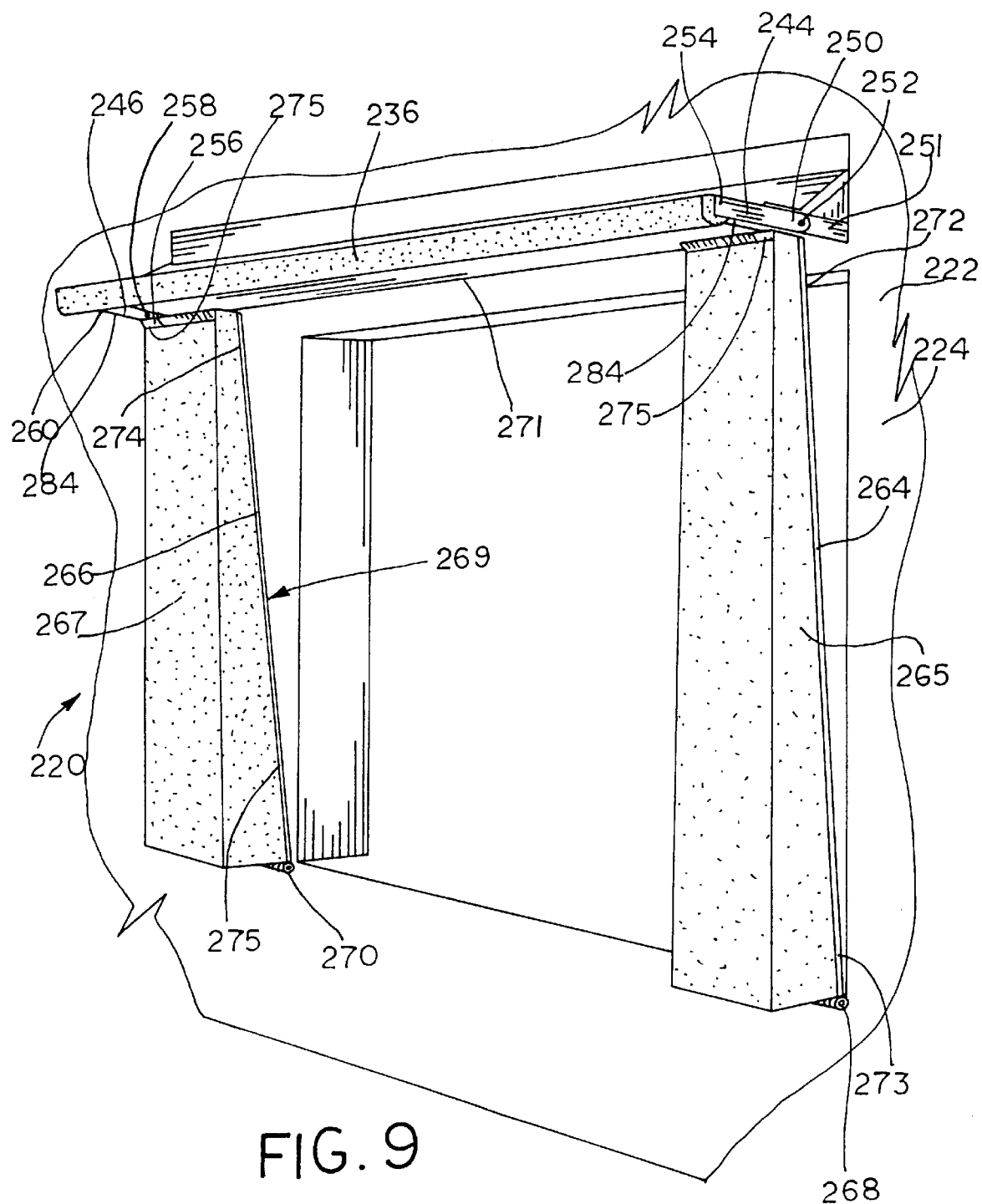
FIG. 9 is a perspective view of a vehicle sealing device constructed in accordance with the teachings of a third embodiment of the present invention and shown mounted for use adjacent a loading dock.
Figure 10:
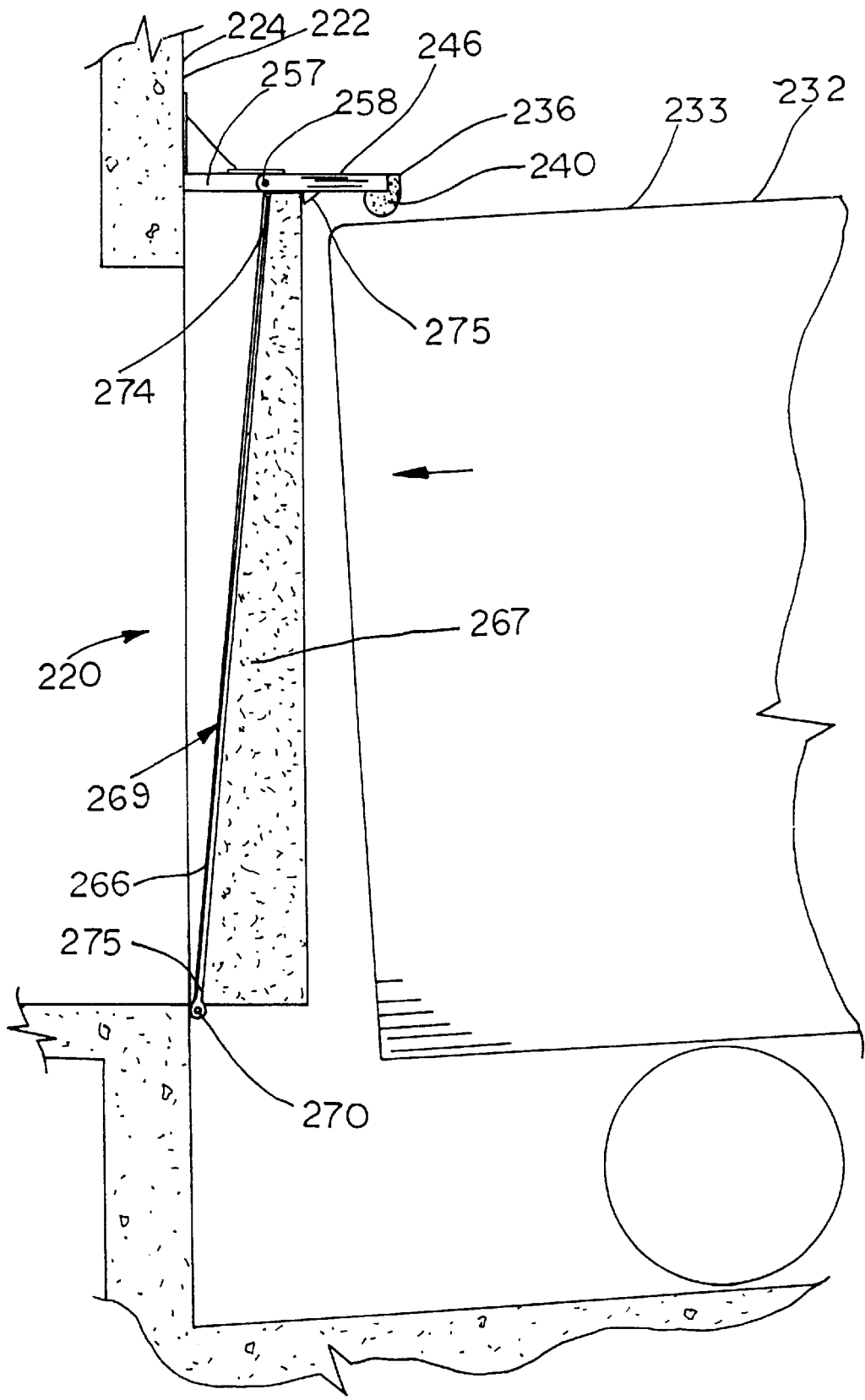
FIG. 10 is a side elevational view of the vehicle sealing device of FIG. 9 showing a truck approaching the loading dock and engaging a portion of the sealing device.
Figure 11:
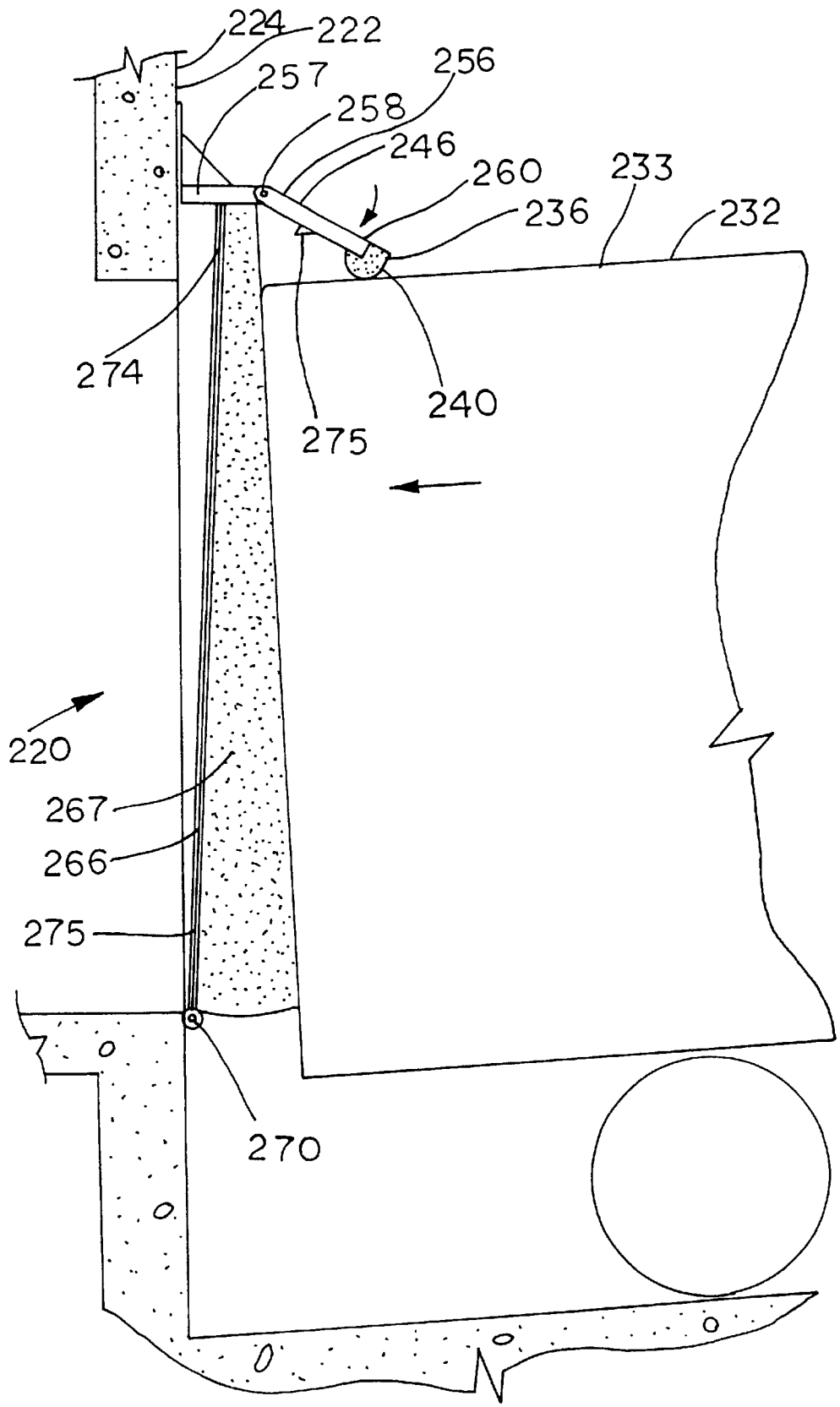
FIG. 11 is a side elevational view of the device shown in FIGS. 9 and 10 but showing the truck parked with the seal engaging the top surface of the truck.

Referring now to FIGS. 9, 10 and 11, a sealing device assembled in accordance with the teachings of a third embodiment of the present invention is shown and is generally referred to by the reference numeral 220. It will be understood that elements that are the same or similar to the elements described with respect to the first embodiment discussed above will retain the same reference characters, but will be increased by 200.

The device 220 includes a resilient, compressible seal member 236 having a pair of ends 238, 240. The seal member 236 is mounted to a supporting frame 242 which includes a pair of members or struts 244, 246 and one or more interconnecting crossbars (not shown) as needed to add stiffness to the frame 242 as would be well known to those of skill in the art. Further, the seal member 236 may include an internal stiffening member (not shown) as needed. The strut 244 includes an inner end 250 mounted to a bracket 251 a pivot 252. The bracket 251 is mounted to the wall 222 of the building 224. The strut 244 also includes an outer end 254. As shown in FIGS. 10 and 11, the strut 246 includes an inner end 256 mounted to a bracket 257 by a hinge 258, with the bracket 257 being mounted to the wall 222 of the building 224. The strut 244 also includes an outer end 260. The end 238 of the seal member 236 is mounted to the outer end 254 of the strut 244 (FIG. 9), while the end 240 of the seal member 236 is mounted to the outer end 260 of the strut 246 (FIGS. 10 and 11). Preferably, the ends 238 and 240 of the seal member 236 are rotatably mounted to their adjacent strut ends 254, 256, respectively, in a manner that would be well known to those of skill in the art.

A pair of actuating members 264, 266 are mounted to the wall 222 of the building 224, each by pivots 268, 270, respectively. The actuating members 264, 266 include an upper end 272, 274, respectively, and lower ends 273, 275, respectively. The actuating members 264 and 266 function as a frame unit 269 with the addition of a stiffening cross member 271 shown in FIG. 9. A seal member 265 is mounted to the actuating member 264, while a seal member 267 is mounted to the actuating member 266. Each of the upper ends 272, 274 of the actuating member 264, 266, respectively, is positioned to operatively engage the frame 242 by engaging a bottom surface 284 of each of the struts 244, 246 as will be explained below. Each strut 244, 246 preferably includes a stop member 275.

As shown in FIG. 10, when the device 220 is not in use, the actuating members 264, 266, and their attached seal members 265, 267, respectively, are disposed such that the upper ends 272, 274 are spaced away from the wall 222 of the building 224 (i.e., the actuating members 264, 266 rotate about their respective pivots 268, 270). When the actuating members 264, 266 are in the position of FIG. 10, the upper ends 272, 274 contact and support the bottom surface 284 each strut 244, 246 of the frame 242 in the raised or disengaged position shown. The struts 244, 246 are positioned such that the seal member 236 is disposed in an upward position and away from the wall 222. The stop members 275 prevent the actuating members from rotating too far about their pivots 268, 270.

When a vehicle 232 approaches the building 224 and makes contact with the seal members 265 and 267 as shown in FIG. 11, the actuating members 264 and 266 are rotated about their respective pivots 268, 270 such that the upper ends 272, 274 are moved closer to the wall 222. In the process, the upper ends 272, 274 are moved past the pivots 252, 258 supporting the frame 242, such that frame 242 and the struts 244, 246 are now free rotate. Upon rotation of the frame 242 about the pivots 252, 258, the seal member moves downwardly (and slightly inwardly) along a generally arcuate path until the seal member 236 contacts the upper surface of the vehicle 232. It will be understood that upon continued movement of the vehicle 232 toward the building 224, the vehicle 232 will move the actuating members to a generally vertical position abutting the wall 222 and will compress the seal members 265 and 267 to form a seal about a rear portion of the vehicle. It will be understood that the opposite relative movement will be produced by movement of the vehicle 232 away from the building 224.

The actuating members 264, 266 may be disposed in a supporting position in which the actuating members 264, 266 support their corresponding struts 244, 246 of the frame 242 such that the seal member 236 will be supported in the position of FIGS. 9 and 10. By virtue of the vehicle 232 approaching the building 224, the members 264, 266 will be shifted toward the non-supporting position of FIG. 11, such that the frame 242 and the attached seal member 236 will shift downwardly (i.e., by dropping under the force of gravity as each strut 244, 246 of the frame 242 rotates about its hinge 252, 258) in order to bring the seal member 236 into contact with a surface 233 of the vehicle 232.

Referring now to FIGS. 12, 12A, 13, 13A and 14, a sealing device assembled in accordance with the teachings of a fourth embodiment of the present invention is shown and is generally referred to by the reference numeral 320. It will be understood that elements that are the same or similar to the elements described with respect to the first embodiment discussed above will retain the same reference characters, but will be increased by 100.

The device 320 includes a resilient seal member 336 mounted to a supporting frame 342 which includes a pair of members or struts 344, 346 and an interconnecting crossbar 348. The strut 344 includes an inner end 350 mounted to the wall 322 of the building 324 by a pivot or hinge 352. The strut 344 also includes an outer end 354. The strut 346 includes an inner end 356 mounted to the wall 322 of the building 324 by a pivot or hinge 358. The strut 344 also includes an outer end 360. The end 338 of the seal member 336 is mounted to the outer end 354 of the strut 344, while the end 340 of the seal member 336 is mounted to the outer end 360 of the strut 346. Preferably, the ends 338 and 340 of the seal member 336 are rotatably mounted to their adjacent strut ends 354, 356, respectively.

A pair of actuating members 364, 366 are mounted to the wall 322 of the building 324 by a pair of pivots or hinges 368, 370, respectively. The actuating members 364, 366 include an upper end 372, 374, respectively. The actuating members 364, 366 are preferably tubular steel members. Each of the upper ends 372, 374 of the actuating member 364, 366, respectively, is operatively coupled to its corresponding strut 344, 346 by a coupling assembly 376.

It will be noted that the coupling assembly 376 between the upper end 374 of the actuating member 366 and the strut 346 is identical to the coupling assembly 376 at the upper end 372 of the actuating member 364. Accordingly, only one such coupling assembly 376 will be described herein in detail. The operation of the coupling assembly 376 atop each of the actuating members 364 and 366 is substantially identical and produces substantially identical relative movement between the actuating members 364, 366 and their associated struts 344, 346 as will be explained below.

Figure 12:
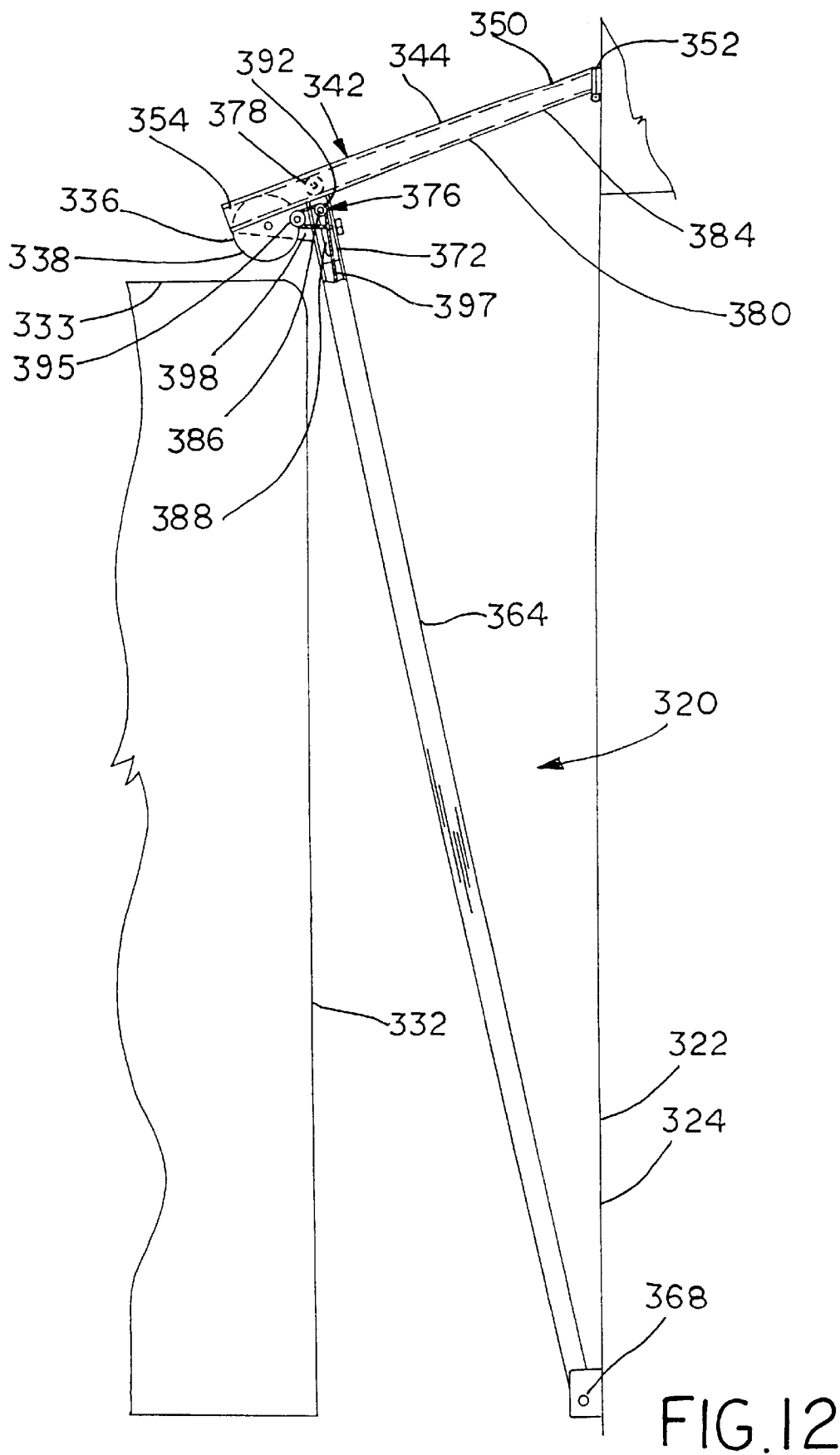
FIG. 12 is an elevational view of a vehicle sealing device constructed in accordance with the teachings of a fourth embodiment of the present invention and shown mounted for use adjacent a loading dock.
Figure 12:
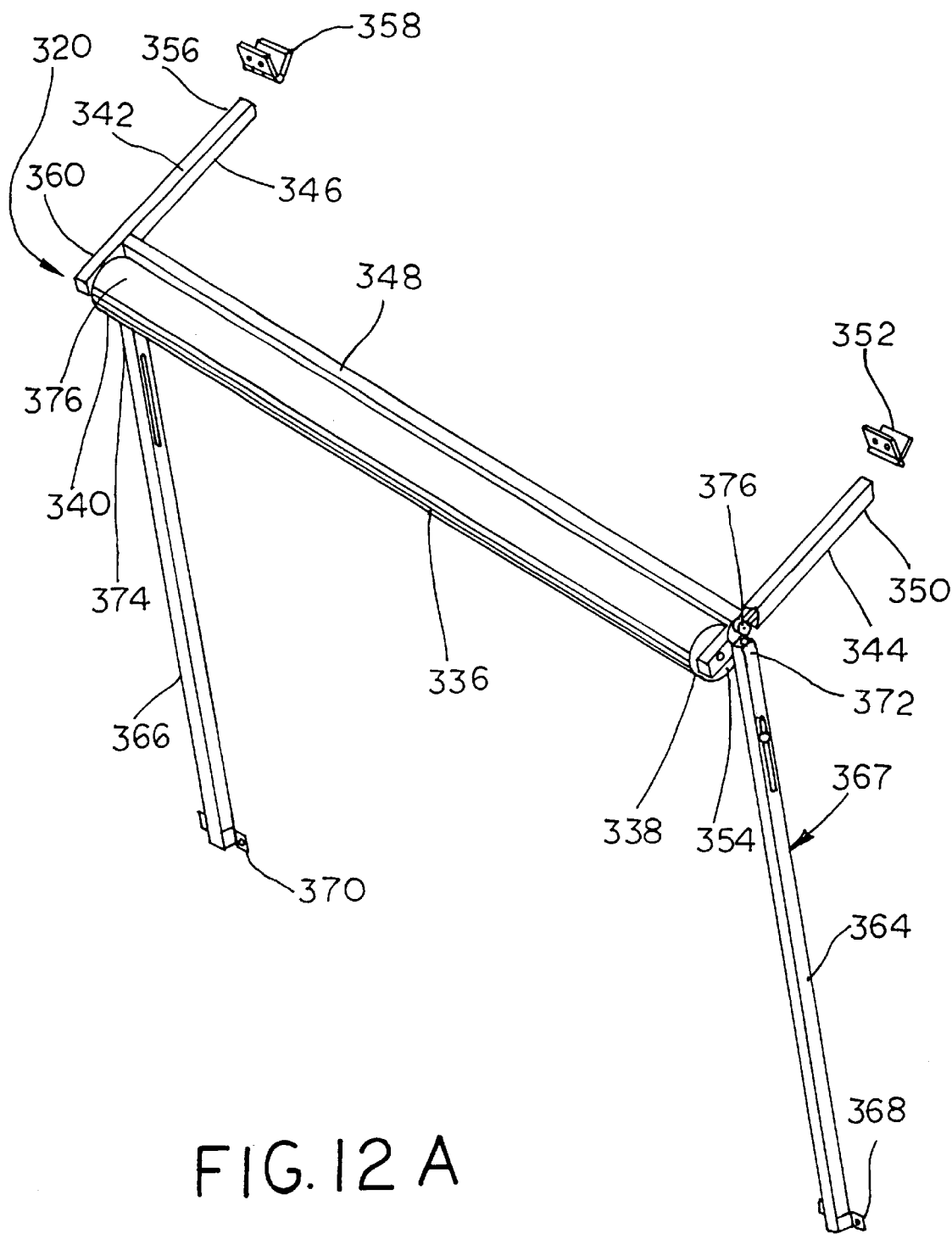
Figure 13:
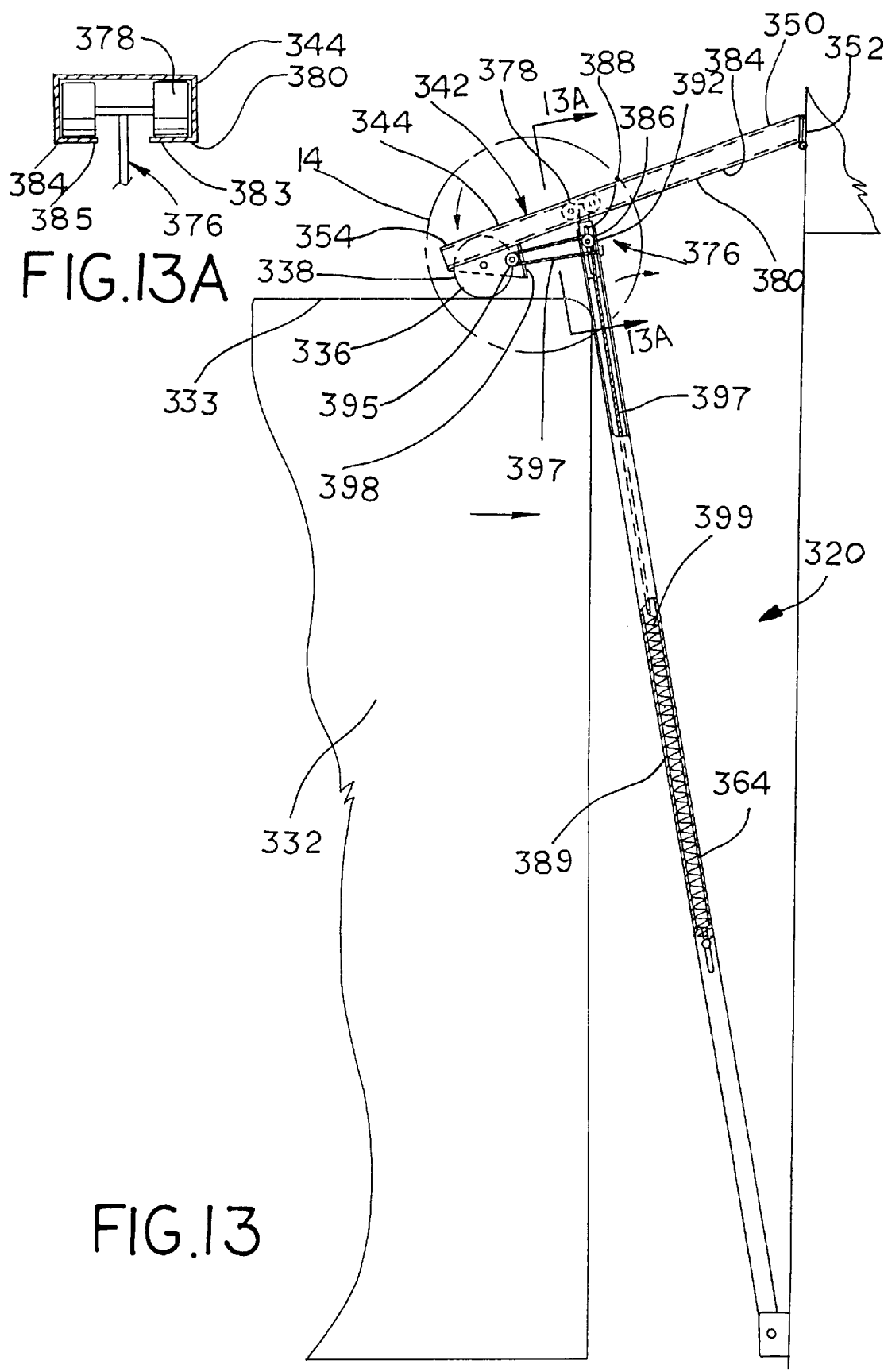
FIG. 13 is a side elevational view of the vehicle sealing device of FIG. 12 showing a truck approaching the loading dock and engaging a portion of the sealing device.
Figure 14:
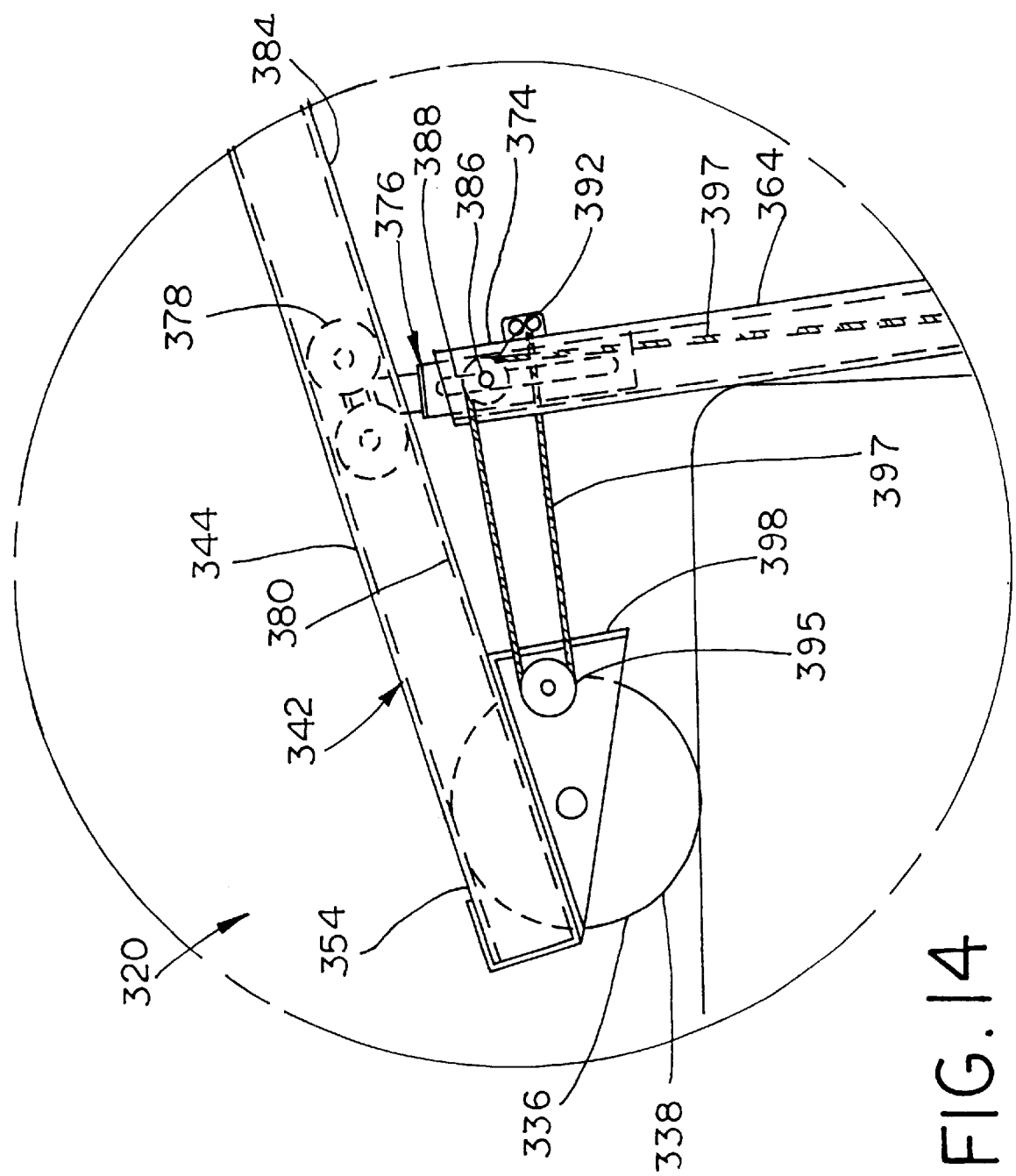
FIG. 14 is an enlarged fragmentary view taken about the circumscribed portion of FIG. 13 and detailing portions of the coupling.

As shown in Pig. 13A, the coupling assembly 376 includes a roller or trolley assembly 378 which rides on a track 380 defined by a slot 382 in a bottom surface 384 of the strut 344. The slot 382 is created by a pair of flanges 383, 385. As shown in FIGS. 12, 13 and 14, a portion of the trolley assembly 378 extends into and is slidably connected to the upper end 374 of the actuating member 364 by a bolt 386 through a slot 388. The bolt 386 also secures a pulley 392 within the upper end 374. The bolt in slot connection permits the coupling assembly 376 to be extensible away from the upper end 372 of the actuating member 364 as the device 320 shifts between the position of FIG. 12 toward the wall 322 (i.e., toward the positions of FIGS. 13 and 14). A pulley 395 is also mounted to an angled stop bracket 398. A spring 389 includes a lower end 390 which is adjustably mounted to the actuating member 364 such as by a bolt and slot connection 393. A cable 397 is connected to an upper end 399 of the spring 389 and is routed over both of the pulleys 392 and 395.

By virtue of the trolley assembly 378 engaging the track 380 of the strut 344, the coupling assembly 376 (and hence the upper end 372 of the actuating member 364) is moveable along the strut 344 between the outer end 354 and the inner end 350 of the strut 344. As shown in FIG. 13, inward movement of the actuating member 364 caused by an approaching vehicle 332 produces a corresponding movement in the position of the frame 342 and the attached seal member 336, between the raised, disengaged, or released position of FIG. 12 (in which the actuating members 364, 366 effectively support the frame 342) and a partially lowered or engaged position of FIG. 13 (in which the actuating members 364, 366 are moved to a non-supporting position in which the actuating members 364, 366 no longer support the frame 342). As shown in FIG. 13, in response to movement of the vehicle 332 toward the building 324 the frame 342 rotates downwardly (i.e., in a counterclockwise direction when viewing FIG. 13) until the seal member 336 contacts the surface 333 of the vehicle 332. The contact between the seal member 336 and the surface 333 effectively limits the downward rotation of the struts 344, 346, although the spring 389 provides a biasing force which serves to compress the seal 336 slightly in order to enhance the seal at the surface 333. The coupling assembly 376 will also maintains the seal member 336 in the lowered or engaged position (i.e., in contact with the surface 333) despite vehicle "float.". Upon movement of the vehicle 332 away from the building 324, the spring 389 applies a tensile force on the cable 397, which by virtue of the pulleys 392 and 395, biases the actuating member 364 outwardly away from the building 324 to the position of FIG. 12, in which the frame 342 and the seal member 336 are again supported by the actuating members 364, 366.

Those skilled in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed:

1. A device for sealing the surface of a vehicle parked adjacent a structure, comprising:

a seal member;

a frame supporting the seal member, tube frame adapted to be mountable to the structure and moveable between a lowered engaged position in which the seal is positioned to engage the vehicle surface and a raised released position in which the seal is vertically spaced away from the vehicle surface; and an actuating member, the actuating member adapted to be moveable at least horizontally relative to the structure, the actuating member engaging the frame to support the frame against downward movement when the frame is in the raised released position, the actuating member arranged to be responsive to movement of the vehicle to thereby permit the frame to move toward the lowered engaged position as the vehicle approaches the structure.

2. The sealing device of claim 1, wherein the seal member is rotationally mounted to the frame.

3. The sealing device of claim 1, wherein the frame includes a strut having an inward end disposed adjacent the structure and an outward end, and further wherein the actuating member is operatively coupled to the frame strut by a coupling assembly, the coupling assembly being moveable along the strut.

4. The sealing device of claim 3, wherein a portion of the strut defines a longitudinal track, and the coupling assembly includes a wheeled trolley engaging the track.

5. The sealing device of claim 1, wherein the actuating member is operatively coupled to the frame by an extensible coupling assembly.

6. The sealing device of claim 5, wherein the coupling assembly includes a trolley adapted for longitudinal movement along the frame as the frame is shifted between the engaged and released positions, the trolley being connected to the actuating member by an extensible spring.

7. The sealing device of claim 6, wherein the spring is adjustably connected to the actuating member.

8. The sealing device of claim 1, wherein the actuation member includes an upper end and a lower end and a pivot mounted intermediate the ends for connection to the structure, and further including a return spring disposed at the lower end for connection to the structure for biasing the frame member toward the released position.

9. The sealing device of claim 1, including a return assembly operatively connected to the frame and being adapted to return the frame to the released position.

10. The sealing device of claim 1, including a resilient member operatively engaging the frame for biasing the frame toward the released position.

11. A device for sealing the surface of a vehicle parked adjacent to a structure, comprising:

a frame adapted to be pivotally mounted to the structure;

a seal mounted to the frame and positioned to span the vehicle surface; and an actuating member responsive to horizontal movement of the vehicle, the actuating member adapted to be pivotally mounted to the structure and engaging the frame, the actuating member being adapted to shift the frame between a raised released position in which the seal is spaced vertically away from the vehicle surface and a lowered engaged position in which the seal abuts the vehicle surface from above.

12. A device for sealing the surface of a vehicle parked adjacent to a structure, comprising:

a frame adapted to be pivotally mounted to the structure;

a seal, the seal rotationally mounted Lo the frame and positioned to span the vehicle surface; and an actuating member responsive to movement of the vehicle, the actuating member adapted to be pivotally mounted to the structure and engaging the frame, The actuating member being adapted to shift the frame between a released position in which the seal is spaced from the vehicle surface and an engaged position in which the seal abuts the vehicle surface.

13. The device of claim 11, wherein the frame includes a strut having an inward end disposed adjacent the structure and an outward end, and further wherein the actuating member is operatively coupled to the frame strut by a coupling assembly, the coupling assembly being moveable along the strut.

14. The device of claim 13, wherein a portion of the strut defines a longitudinal track, and the coupling assembly includes a wheeled trolley engaging the track.

15. The device of claim 11, wherein the actuating member is operatively coupled to the frame by an extensible coupling assembly.

16. The device of claim 15, wherein the coupling assembly includes a trolley adapted for longitudinal movement along the frame as the frame is shifted between the engaged and released positions, the trolley being connected to the actuating member by a resilient member.

17. The device of claim 16, wherein the spring is adjustably connected to the actuating member.

18. The device of claim 11, wherein the actuation member includes an upper end and a lower end and a pivot mounted intermediate the ends, the pivot being adapted for connection to the structure, and including a return spring mounted to the actuating member lower end, the return spring further being adapted for connection to the structure for biasing the frame toward the released position.

19. The device of claim 11, including a return assembly operatively connected to the frame and being adapted to return the frame to the released position.

20. The device of claim 11, including a resilient member operatively engaging the frame for biasing the frame toward the released position.

21. A device for sealing a surface of a vehicle parked adjacent to a structure, the device comprising:

a frame, the frame moveable about a first pivot between a first position and a second position;

a seal mounted to the frame, the seal sized to span the surface of the vehicle; and an actuating member, the actuating member moveable about a second pivot between an extended position and a retracted position, the actuating member operatively engaging the frame such that the frame is moveable between the first position and the second position in response to movement of the actuating member between the extended position and the retracted position;

whereby upon movement of the frame toward the second position the seal may be placed in contact with the surface of the vehicle when the vehicle is parked adjacent the structure.

22. The device of claim 21, the structure defining a plane, and wherein the actuating member and the second pivot are positioned so that the actuating member is responsive to movement of the vehicle toward and away from the plane.

23. The device of claim 21, including a return assembly operatively engaging at least one of the frame and the actuating member, the return assembly arranged to bias the frame toward the first position.

* * * * *

UNITED STATES PATENT AND TRADEMARK OFFICE
CERTIFICATE OF CORRECTION

PATENT NO.    : 6,425,214 B1
DATED         : July 30, 2002
INVENTOR(S)   : Thomas J. Boffeli and Kenneth F. Lenz It is certified that error appears in the above-identified patent and that said Letters Patent is hereby corrected as shown below:

<u>Column 12,</u>
Line 1, please delete "mounted Lo the" and insert -- mounted to the --.
Line 5, please delete "the frame, The" and insert -- the frame, the --.

Signed and Sealed this

Seventeenth Day of June, 2003

JAMES E. ROGAN
*Director of the United States Patent and Trademark Office*